United States Patent [19]
Satoh et al.

[11] Patent Number: 5,264,779
[45] Date of Patent: Nov. 23, 1993

[54] APPARATUS FOR CONTROLLING AC GENERATOR IN VEHICLE

[75] Inventors: Kiyokatsu Satoh, Saitama; Mitsuharu Morishita, Hyogo, both of Japan

[73] Assignees: Mitsubshi Denki K.K., Tokyo; Sanken Electric Co., Ltd., Saitama, both of Japan

[21] Appl. No.: 944,173

[22] Filed: Sep. 11, 1992

[30] Foreign Application Priority Data

Sep. 20, 1991 [JP] Japan ................. 3-240834

[51] Int. Cl.⁵ .................................... H02J 7/14
[52] U.S. Cl. ....................... 322/28; 320/64; 322/99
[58] Field of Search .............. 322/28, 99; 320/64

[56] References Cited

U.S. PATENT DOCUMENTS

| | | | |
|---|---|---|---|
| 4,346,338 | 8/1982 | Nakamoto et al. | 322/28 |
| 4,471,287 | 9/1984 | Morishita et al. | 322/99 |
| 4,549,128 | 10/1985 | Morishita et al. | 322/99 |
| 4,812,732 | 3/1989 | Iwatani | 322/99 |
| 4,945,277 | 7/1990 | Iwatani et al. | 322/99 X |

FOREIGN PATENT DOCUMENTS

| | | |
|---|---|---|
| 0013496 | 7/1980 | European Pat. Off. |
| 2354796 | 5/1975 | Fed. Rep. of Germany. |
| 3308415 | 9/1983 | Fed. Rep. of Germany. |
| 59-86436 | 5/1984 | Japan. |
| 63-110924 | 5/1988 | Japan. |

*Primary Examiner*—R. J. Hickey
*Attorney, Agent, or Firm*—Sughrue, Mion, Zinn, Macpeak & Seas

[57] ABSTRACT

An apparatus for controlling an AC generator in a vehicle, the AC generator including an exciting coil and driven by an engine to generate an AC output which is rectified and fed to a battery, includes a pilot-lamp switching transistor device constituted by a Darlington-connection of transistors, the pilot-lamp switching transistor device having a base and a collector for turning a pilot lamp on/off, the pilot lamp being fed with a current from the battery through a key switch, a resistor connected between the base and the collector of the pilot-lamp switching transistor, an initial exciting transistor for controlling a current for the initial excitation of the exciting coil by the battery, a voltage detection circuit for detecting a voltage of the battery, and a voltage detection circuit switching transistor for controlling a switching operation of the voltage detection circuit. In the control apparatus, at least one of the initial exciting transistor and the voltage detection circuit switching transistor is driven by a collector potential of the pilot-lamp switching transistor.

5 Claims, 2 Drawing Sheets

APPARATUS FOR CONTROLLING AC GENERATOR IN VEHICLE

BACKGROUND OF THE INVENTION

1. Field of the Invention

The present invention relates to a control apparatus for an AC generator in a vehicle.

2. Prior Art

FIG. 1 shows the arrangement of a conventional control apparatus for an AC generator in a vehicle, in which reference numeral 1 designates an AC generator to be driven by a car engine; 101, an armature coil; 102, a field coil; 2, a rectifier; 201, a main rectification output terminal; 202, an auxiliary rectification output terminal for exciting the field coil 102 by the output; and 203, a grounding terminal. Reference numeral 3 designates a voltage regulator; 301, 304, 311, 318, and 324, transistors; 305, 310, and 323, Zener diodes; 302, 319, and 328 diodes; 303, 306, 307, 314, 315, 317, 319, 320, 321, 322, and 325, resistors; 308, an initial exciting transistor; 313, an initial excitation driving transistor; 316, a voltage detection circuit connecting/disconnecting transistor; 326 and 327, NPN-type Darlington transistors; 312, an oscillator; 4, a battery to be charged by the output of the rectification output terminal 201; 5, a key switch; and 6, a pilot lamp.

The operation of the control device thus arranged will be described hereunder. When the key switch 5 is turned on, a voltage is applied from the battery 4 to the pilot lamp 6 and the resistors 319 and 320 through the key switch 5 to thereby turn the transistor 318 on. Accordingly, the transistors 316 and 313 are also turned on, the initial exciting transistor 308 is actuated to operate, a current is allowed to flow into the field coil 102 to thereby render the field coil 102 in an initial excition state. At the same time, a voltage is applied from the battery 4 to the resistors 306 and 307 through the transistor 316 so that the voltage is detected.

Further, the transistor 313 is turned on so that base current flows respectively into the transistors 326 and 327 through the resistor 325 to thereby turn the transistors 326 and 327 on. A current flows from the battery 4 through the key switch 5, the pilot lamp 6, the diode 328, and the transistors 326 and 327 to thereby light the pilot lamp 6. At that time, the sum of the forward voltage drop (about 0.7V) of the diode 328 and the saturation voltage (about 1.2V) between a collector of the transistor 326 and an emitter of the transistor 327 becomes about 1.9V, so that the transistor 318 is maintained in the on-state.

However, if the voltage of the AC generator 1 becomes high as the engine rotates more rapidly so that the voltage of the battery 4 rises, the Zener diode 305 is rendered conductive so that the transistor 304 is turned on, the transistor 301 is turned off, and the current is stopped flowing into the field coil 102. Further, at that time, the output at the auxiliary output terminal 202 also becomes high and the Zener diode 323 is rendered conductive so that the transistor 324 is turned on, the Darlington transistors 326 and 327 are turned off, and the pilot lamp 6 is also turned off.

In the conventional apparatus described above, the forward voltage drop of the diode 328 is utilized to keep the transistor 318 in the on-state, that is, to keep the initial exciting transistor 308 and the voltage detection circuit connecting/disconnecting transistor 316 in the on-state. Accordingly, the configuration is complicated and expensive.

SUMMARY OF THE INVENTION

The present invention has been attained to solve the problems as described above, and an object thereof is to provide a control apparatus for an AC generator in a vehicle, which is simple in configuration and inexpensive in cost.

The control apparatus for an AC generator in a vehicle according to the present invention is arranged so that a pilot-lamp switching transistor is constituted by a Darlington-connection of transistors so as to have a base and a collector to thereby perform the turning on/off operation of a pilot lamp into which a current flows from a battery through a key switch, and a resistor is connected between the collector and the base of the pilot-lamp switching transistor so that at least one of an initial exciting transistor and a voltage detection circuit switching transistor is driven by a collector potential of the pilot-lamp switching transistor.

According to the present invention, a saturation voltage between the collector and base of the pilot-lamp switching transistor is made high by the resistor connected between the collector and the base, so that the conductive state of the initial exciting transistor or the voltage detection circuit switching transistor is maintained by the collector potential of the pilot-lamp switching transistor.

DETAILED DESCRIPTION OF THE PREFERRED EMBODIMENTS

Figure 1:
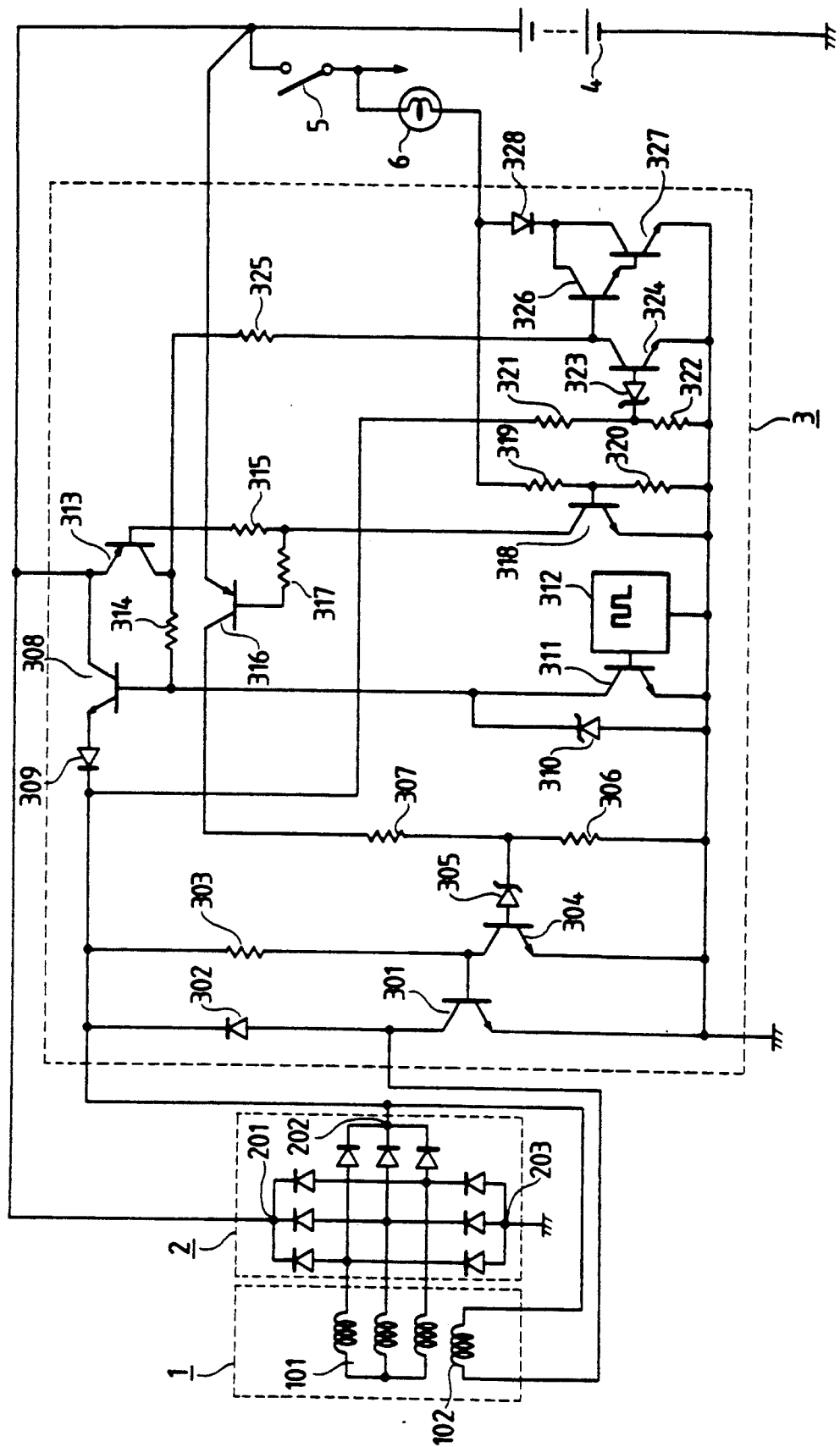
FIG. 1 is a circuit diagram of a conventional apparatus.
Figure 2:
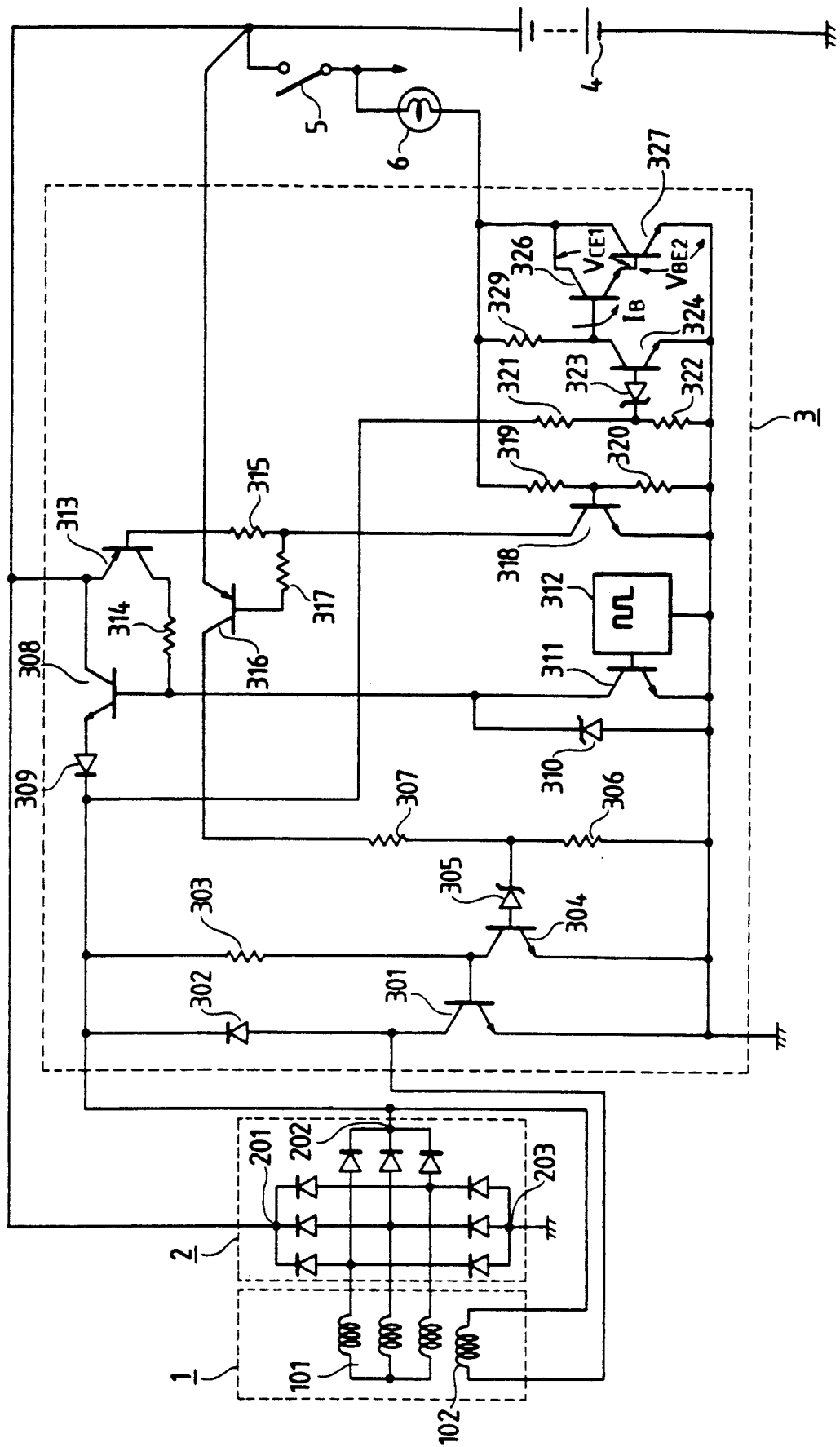
FIG. 2 is a circuit diagram of the apparatus according to the present invention.

An embodiment of the present invention will be described with reference to FIG. 2. FIG. 2 shows a diagram of a control circuit for an a.c. generator in a vehicle according to the present invention, in which reference numeral 329 designates a resistor connected between respective collectors and bases of Darlington transistors 326 and 327. The diode 328 and the base resistor 325 of the Darlington transistors 326 and 327 driven by the transistor 313 in the conventional apparatus have been removed here. The remaining configuration is the same as that of the conventional apparatus.

The operation of this arrangement will be described hereunder. When a key switch 5 is turned on, a base current flows from a battery 4 into the Darlington transistors 326 and 327 through a pilot lamp 6 and the resistor 329. At that time, the collector potential of the Darlington transistors 326 and 327 becomes the sum of a voltage $V_{VE2}$ (about 0.7V) between a base and an emitter of the transistor 327, a voltage $V_{CE1}$ (about 0.3V) between a collector and an emitter of the transistor 326, and a product of a base current $I_B$ and a base resistance of the resistor 329. Accordingly, when the value of the base resistance of the resistor 329 is suitably selected, the potential difference equivalent to that of the forward voltage drop of the conventional diode 328 can be obtained.

That is, when the self-biasing resistor 329 is inserted between the collector and base of the NPN-type Darlington transistors 326 and 327 for driving the pilot lamp 6, the saturation voltage can be made high, so that the diode 328 inserted for increasing the voltage drop in the conventional apparatus can be omitted. Accordingly, the on-state of the transistors 318, 313, 316, and 308 can be maintained by this collector potential, so that the on-state of the initial exciting circuit and the voltage detection circuit can be maintained.

Although an example in which the pilot-lamp switching transistor is constituted by the NPN-type Darlington transistors 326 and 327 has been described in the above embodiment, the same effect can be obtained in the case where individual transistors are Darlington-connected.

Further, although the case in which the negative pole of the battery is grounded has been described in the above embodiment, the case in which the positive pole of the battery is grounded may be preferable, and at that time, PNP-type transistors must be used to constitute the pilot-lamp switching transistor.

As described above, according to the present invention, a resistor is inserted between a collector and a base of Darlington-connected pilot-lamp switching transistors to thereby make the saturation voltage high, so that the initial exciting transistor and the voltage-detection circuit connecting/disconnecting transistor are maintained continuously conductive by the collector potential of the Darlington-connected transistors. It is therefore possible to obtain a control apparatus for an AC generator in a vehicle which is simple in configuration and inexpensive in cost.

What is claimed is:

1. An apparatus for controlling an AC generator in a vehicle, said AC generator including an exciting coil and driven by an engine to generate an AC output which is rectified and fed to a battery, said apparatus comprising:
    a pilot-lamp switching transistor device comprising a Darlington-connection of transistors, said pilot-lamp switching transistor device having a base and a collector for turning a pilot lamp on/off, said pilot lamp being fed with a current from said battery through a key switch;
    a resistor connected between said base and said collector of said pilot-lamp switching transistor device;
    an initial exciting transistor for controlling a current for the initial excitation of said exciting coil by said battery;
    a voltage detection circuit for detecting a voltage of said battery; and
    a voltage detection circuit switching transistor for controlling a switching operation of said voltage detection circuit;
    wherein at least one of said initial exciting transistor and said voltage detection circuit switching transistor is driven by a collector potential of said pilot-lamp switching transistor device.

2. An apparatus as claimed in claim 1, wherein said pilot lamp switching transistor device comprises NPN-type Darlington transistors.

3. An apparatus as claimed in claim 2, wherein a negative pole of said battery is grounded.

4. An apparatus as claimed in claim 1, wherein said pilot lamp switching transistor device comprises PNP-type transistors.

5. An apparatus as claimed in claim 4, wherein said a positive pole of battery is grounded.

* * * * *